INVENTOR.
RALPH C. BOLZ
ROBERT W. JEFFERY
BY

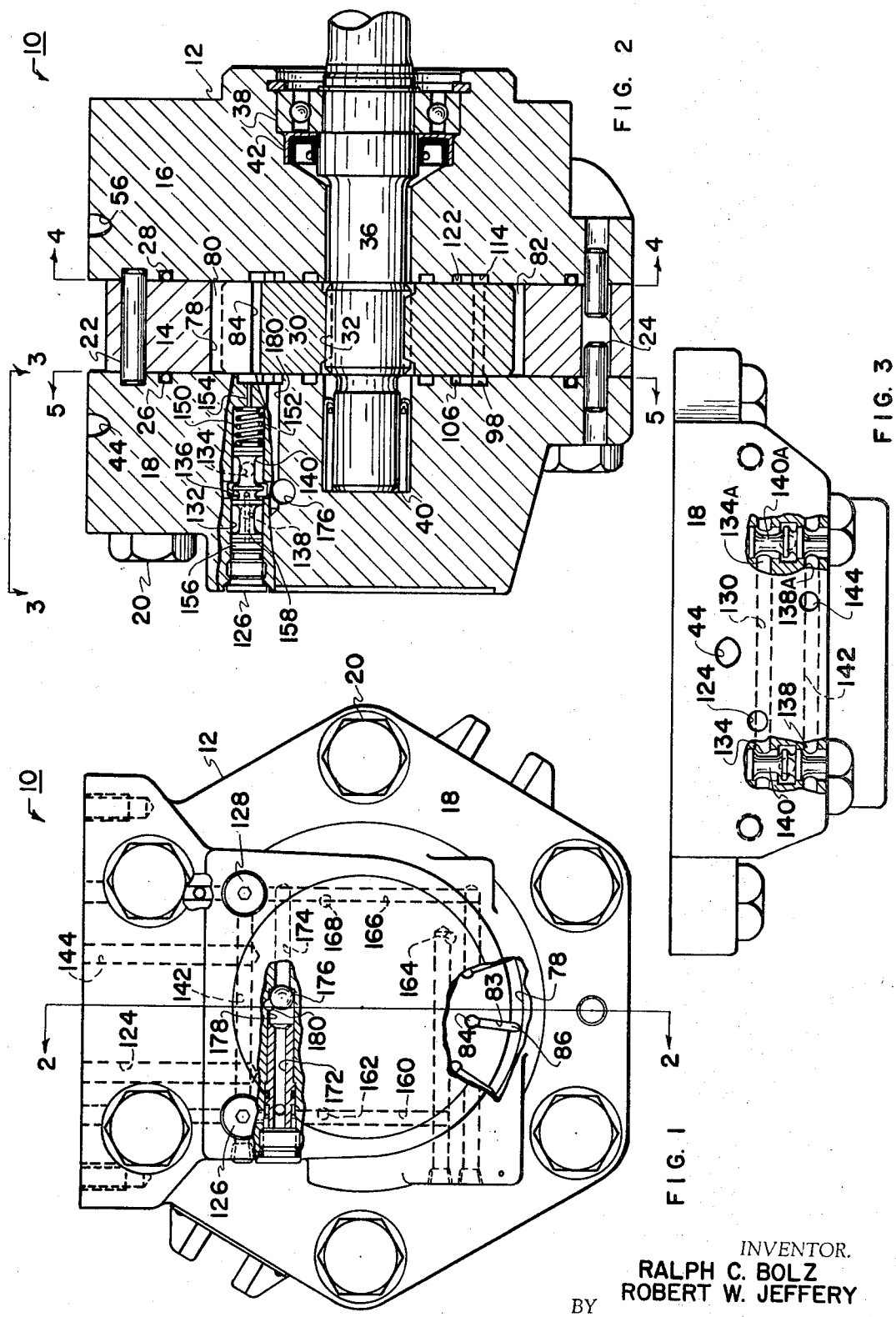

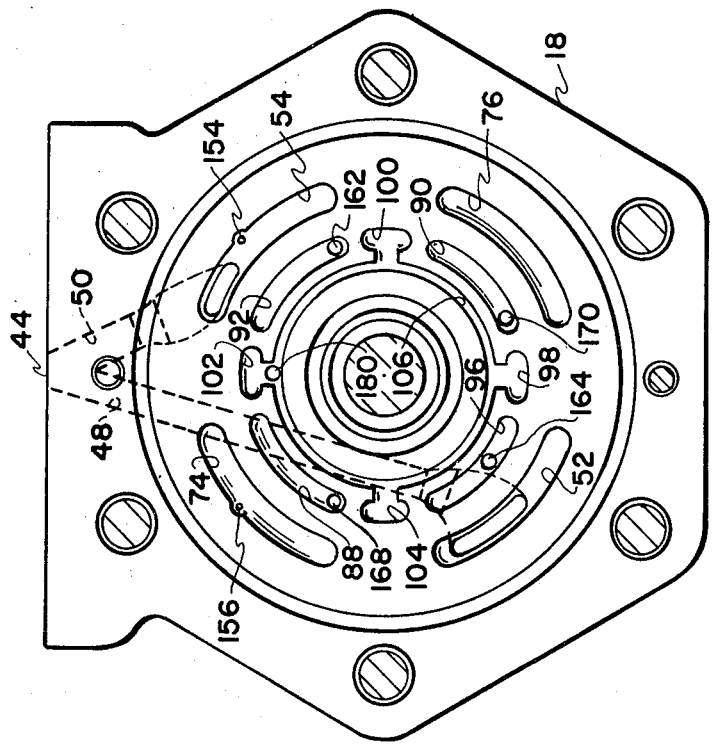
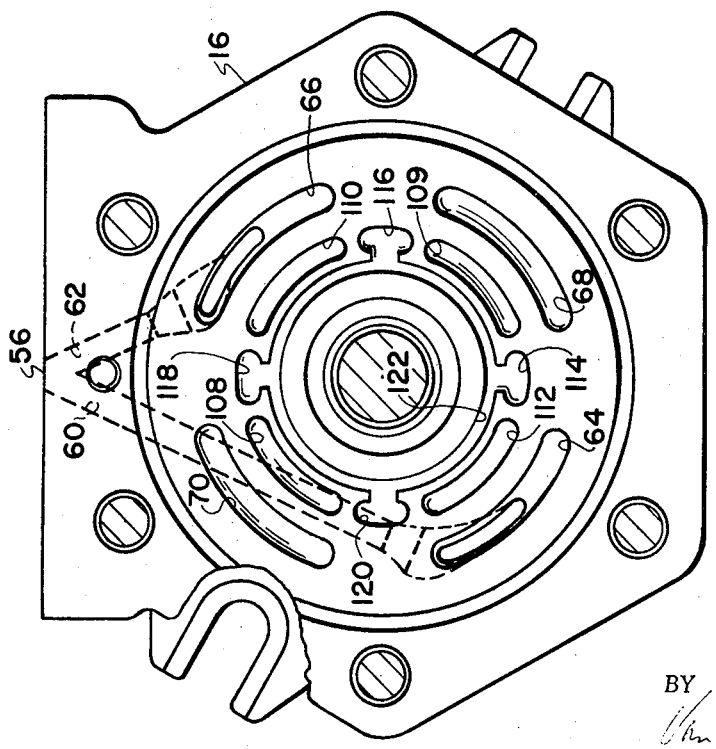

ATTORNEYS

United States Patent Office 3,516,768
Patented June 23, 1970

3,516,768
POWER TRANSMISSION
Ralph C. Bolz, Livonia, and Robert W. Jeffery, Franklin, Mich., assignors to Sperry Rand Corporation, Troy, Mich., a corporation of Delaware
Filed Nov. 1, 1968, Ser. No. 773,372
Int. Cl. F01c *3/02;* F03c *3/00;* F04c *3/00*
U.S. Cl. 418—82                                   11 Claims

ABSTRACT OF THE DISCLOSURE

A fluid energy translating device having rotatably mounted therein a rotor with a plurality of slidably mounted vanes wherein valving means are provided to sense the device operating pressures so as to provide a controlled pressure unbalanced condition between the inner and outer ends of said vanes throughout the entire rotary cycle of the device.

BACKGROUND OF THE INVENTION

This invention relates to power transmissions and is particularly applicable to those of the type comprising two or more fluid pressure energy translating devices, one of which may function as a pump and the other as a fluid motor. More particularly, this invention relates to an improvement in sliding vane type motors and especially to servomotor control systems for use in operating a machine tool and similar mechanisms.

In such machine tools, it is necessary to guarantee both positional accuracy and surface finish specifications to the ultimate user; thus, a servomotor adapted to drive such a machine tool must be capable of operating at a low speed with high performance and with minimal torque pulsation and flow variations. Further, for such systems to be economical, the servomotor should drive the machine tool directly rather than through a gear box. A direct drive accentuates the requirements of low speed smoothness required by a machine tool since any pulses created by the servomotor can more easily be transmitted to the workpiece and may produce unsatisfactory surface finishes. Smooth, low speed operation of such servomotors is obtainable through design features which reduce and minimize internal frictional variations.

Servomotors of this type generally comprise a stator, including a vane cam track within which is rotatably mounted a rotor carrying radially sliding vanes to form fluid inlet and fluid outlet working zones located between the periphery of the rotor and the vane track, either of which may be a low pressure or a high pressure working zone dependent upon the direction of rotation of the rotor. In such devices, the vanes as followers are adapted to follow the cam track and to provide proper sealing between the inlet and outlet porting, correlated with the fluid inlet and fluid outlet zones. Thus, it is essential for operation that the vanes be completely extended outwardly, and that the outer edges of the vanes be maintained in engagement with the track during complete rotary cycle of the device.

During operation of such a device, the vanes are urged outwardly and into engagement with the track by centrifugal force, and also by providing a controlled pressure unbalanced condition between inner and outer surfaces of the vanes. The vane is urged inwardly by th mechanical cam action of the track. If this pressure unbalanced condition between the inner and outer surfaces of the vanes is not great enough, the vanes will not track on the ring, and if this controlled pressure unbalanced condition is excessive, wear between the vanes and vane track will result from excessive friction and also counter torque will be unduly increased. Counter torque is caused by the unbalanced undervane pressures forcing the vanes radially outward against the cam contour, and is comprised of the difference between the torques created by the outlet port vanes and the inlet port. Although the torque created by the inlet port vanes is in the same direction as the output torque of the unit, their magnitude is generally smaller than the torque created by the output vanes which is in the opposite direction. The net of these two torques is, therefore, opposite to the motor output torque, and is thus termed counter torque. Since instantaneous torque is not necessarily a constant as the motor revolves, but is made up by the torque created between the major and minor dwells, and by the counter torque, the smoothest of operations may be achieved by eliminating or minimizing counter torque, since the major and minor dwell torque is of a constant value. The reduction in counter torque would further reduce the pressure differential across the servomotor which is required to start rotation of the same.

In prior art devices, various means have been used to provide a pressure differential between the inner and outer ends of the vanes. However, they usually provide unneeded radially outward auxiliary force on the vanes as they pass through the outlet areas and this force causes the wear of the vanes and vane track which unnecessarily increases the friction between these parts, and thus reduces the efficiency of the motor. Further, such prior art devices usually supply the undervane areas with fluid pressure which is directed from their associated inlet and outlet ports with a resultant increase in the leakage characteristics of the servomotor.

Since the controlled pressure unbalanced condition which is required to keep the vanes against the track during complete rotary cycle of the device varies as the vanes rotate from one working zone to another, it would be desirable to vary this pressure unbalanced condition in such a manner that the pressure differential between the inner end outer ends of the vanes is constant throughout a rotary cycle, so as to maintain proper vane tracking and to eliminate the unnecessary frictional losses, thus contributing to a more uniform torque output of the device. It would also be desirable to accomplish this by supplying the undervane area with a pressure fluid from other than the servomotor inlet and outlet, yet having the undervane pressure being a function of the servomotor inlet and outlet pressures.

SUMMARY OF THE INVENTION

This invention comprises a rotary fluid energy translating device of the sliding vane type with a rotor having radial slots with a plurality of vanes slidably mounted therein, wherein a controlled pressure unbalanced condition between the inner and outer ends of the vanes is provided throughout the entire rotary cycle of the device by providing means which assure a constant pressure differential between the opposite ends of the vanes, wherein the undervane pressure will exceed the outer vane pressure by a predetermined amount; the source of the undervane pressure being independent of the device operating fluid pressures.

It is, therefore, an object of this invention to provide an improved, efficient, and long wearing fluid pressure energy translating device of the sliding vane type.

It is also an object of this invention to provide such a device having an improved vane biasing arrangement which insures complete extension of the vanes, and maintains the same in engagement with the vane track without excessive scoring between the vanes and the vane track throughout the entire rotary cycle of the device.

It is still another object of this invention to provide an improved, rotary fluid pressure energy translating device of the sliding vane type which is capable of smooth, low speed operation with a minimum amount of internal frictional variation and thus with a minimum amount of torque pulsation, irrespective of the direction of rotation of the device.

Further objects and advantages of the present invention will become apparent from the following description, reference being made to the accompanying drawings wherein a preferred form of the invention is clearly shown.

In the drawings:

FIG. 1 is a partially sectional view of the device embodying the present invention.

FIG. 2 is a sectional view taken on line 2—2 of FIG. 1.

FIG. 3 is a partially sectional view taken on line 3—3 of FIG. 2.

FIG. 4 is a sectional view taken on line 4—4 of FIG. 2.

FIG. 5 is a sectional view taken on line 5—5 of FIG. 2.

DESCRIPTION OF THE PREFERRED EMBODIMENT

Figure 6:
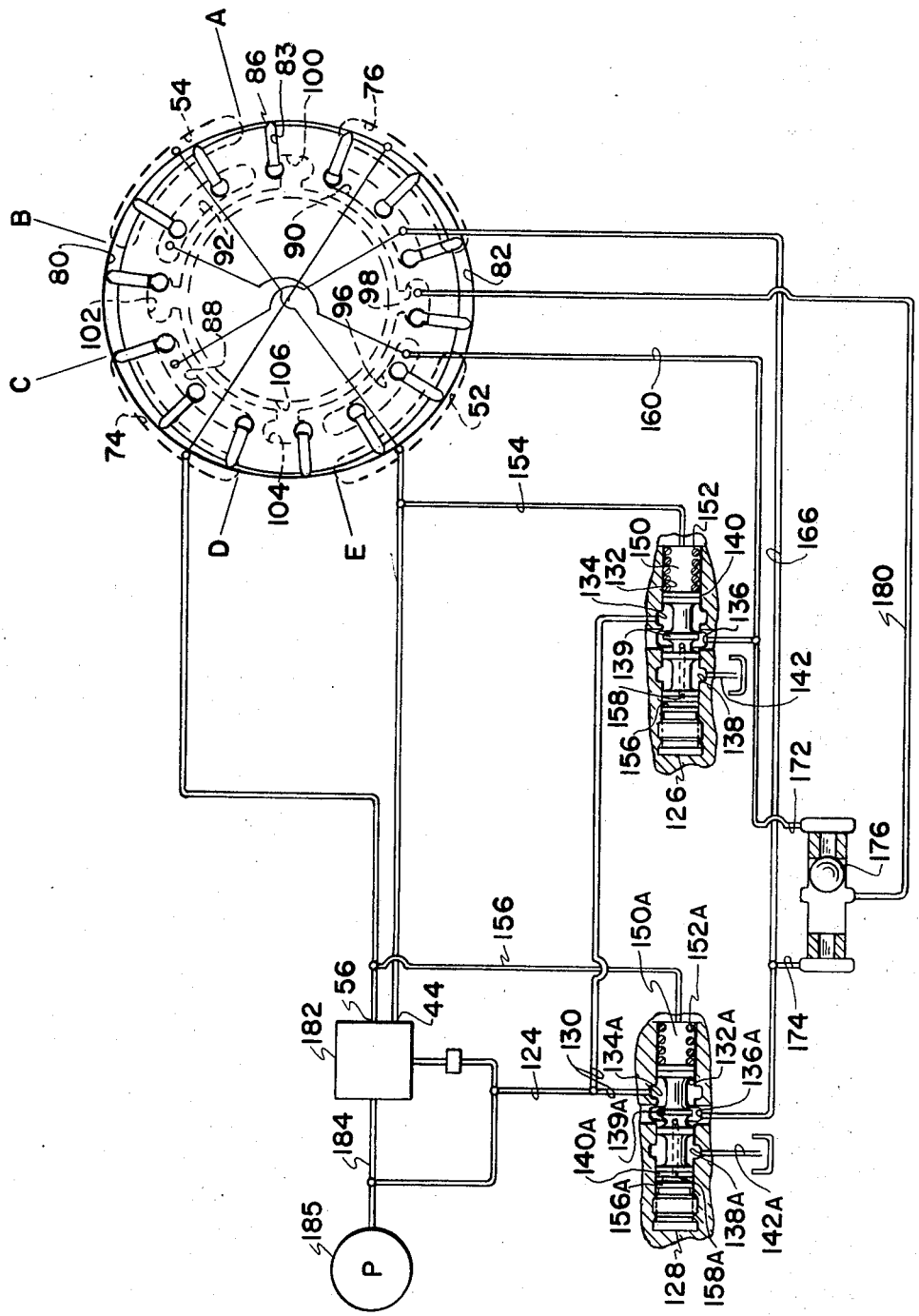
FIG. 6 is a diagrammatic illustration of the motor showing the path of the operating fluid.

Referring now to the several figures, there is shown a presently preferred, but merely illustrative embodiment of the inventive principles; a servomotor 10 of the sliding vane type. The housing 12 of the servomotor 10 comprises a vane cam track section 14 sandwiched between a body section 16 and an end cover 18, all of which are secured to each other by bolts 20 extending through cover 18, cam section 14, and into threaded holes in the body 16. Dowel pins 22 and 24 are provided to insure proper angular alignment between the end cover, cam section and body, while "O" rings 26 and 28 insure a fluid tight seal between the juncture of the end cover, cam section, and body. A rotor 30 is rotatably mounted within the cam section 14 on a spline portion 32 of a shaft 36, which, in turn, is rotatably mounted within bearings 38 and 40 respectively mounted within the body section 16 and the cover plate 18. A seal 42 is provided to prevent leakage passing the shaft 36 during operation. The end cover section 18 is provided with an inlet supply connection port 44 having an inlet passage leading therefrom which has two branches 48 and 50 which are shown in hidden lines in FIG. 5 and which respectively terminate in a pair of diametrically opposed arcuately shaped fluid port openings 52 and 54. The body section 16 is provided with an outlet connection port 56 having an outlet passage leading therefrom which has two branches 60 and 62 which are shown in hidden lines in FIG. 4 and which respectively terminate in a pair of diametrically opposed arcuately shaped fluid port openings 64 and 66. There is provided with the body 16, diametrically opposed arcuately shaped fluid port openings 68 and 70 which are opposite the end cover ports 52 and 54 and are in fluid communication with each other in a manner to be described hereinafter. Within the end cover plate 18 there is provided another pair of diametrically opposed, arcuately shaped fluid openings 74 and 76 which are opposite the fluid openings 64 and 66 within the body 16 and again are in fluid communication in a manner to be described hereinafter. The rotor 30 is sandwiched between these fluid openings, that is between the cover plate 18 and the body 16.

The contour of the inner surface of the cam section 14 forms a vane track substantially elliptical in shape and is indicated by the numeral 78 which, together with the periphery of the rotor and the adjoining surfaces of the body and end cover, define two opposed working chambers which are indicated by the numerals 80 and 82, each of which for the purposes of convenience, may be divided into fluid inlet and fluid outlet zones, which form a sliding vane device of the double throw type. The fluid inlet zone comprises those portions of the working chambers 80 and 82 respectively registering with the fluid inlet port openings 54 and 52 of the inlet passages 48 and 50. The fluid inlet port openings 68 and 70 are also in communication with the fluid inlet zones. The fluid delivery zones comprises those portions of the working chambers 80 and 82 registering respectively with the opposed arcuately shaped fluid port openings 64 and 66 and also with opposite fluid opening ports 74 and 76.

The vane track of the device includes an inlet zone ramp extending from A to B (FIG. 6), a true arc portion extending from B to C, a delivery zone ramp extending from C to D, and another true arc portion extending from D to E. The track is symmetrical about each of its major and minor axes, thus, each of the ramps and true arc portions from A to E are duplicated in the remaining opposed portions of the track.

The rotor 30 has a plurality of radial slots 83 (FIG. 1 and FIG. 6) formed therein, and which extend completely around the outer periphery of the rotor. Each slot extends from the periphery of the rotor to an enlarged pressure chamber formed therein and which is indicated by the numeral 84. Within each radial slot there is reciprocally mounted a rectangularly shaped vane 86. As the ends of the vanes 86 carried by the rotor traverse the inlet ramps, the vanes move radially outward with respect to the rotor, and while the vane ends traverse the delivery ramps, the vanes move radially inward. In the true arc portions, the vanes generally partake of no radial movement, however, the true arc portions may optionally have a slight rise.

For the purpose of connecting pressure fluid to the enlarged pressure chamber 84 beneath each vane, there is provided in both the cover plate 18 and the body 16 opposite each side of the rotor, angularly spaced apart grooves with which the enlarged pressure chamber 84 communicates as the rotor rotates through a cycle of the device. These angularly spaced apart grooves within the end cover 18 consist of diametrically opposed grooves 92 and 96 which extend from A to B, and diametrically opposed grooves 88 and 90, which extend from C to D. Interspaced between the two pairs of diametrically opposed grooves, there is provided four grooves 98, 100, 102 and 104, each of which is located in a true arc portion, one extending from B to C, the second extending from D to E, the other two being located in the opposed portions of the track. The grooves located within the true arc portions are fluidly connected by means of an annular circular groove 106.

The angularly spaced apart grooves formed within the body 16 consist of diametrically opposed grooves 108 and 109 which extend from A to B and the diametrically opposed grooves 110 and 112 which extend from C to D. Interspaced between the two pair of diametrically opposed grooves there is provided the grooves 114, 116, 118, and 120, each of which is located in a true arc portion and connected by means of an annular groove 122. The method by which these grooves communicate high pressure fluid with the high pressure chambers 84 beneath the vanes will be explained hereinafter.

The servomotor 10 is adapted to be connected to a servo valve mechanism (indicated diagrammatically in FIG. 6 by the numeral 182) which is adapted to selectively connect pressure fluid to one of the ports 44 and 56 and receive return fluid from the other, in a manner well-known in the art. The servomechanism which is connected to a source of high pressure energy will, in addition to selectively connecting pressure fluid to the ports 44 and 56, continuously direct pressure fluid to an intake port 124 which is indicated in FIG. 3. Due to the operation of the servomechanism, the pressure of the fluid entering the intake port 124 will always be at a higher value than that of the operating pressures entering ports 44 and 56. As illustrated in FIG. 6, pressure port 124 is connected to two spool valves 126 and 128 by means of a passageway 130 which is provided within the cover plate 18. The valve 126, clearly illustrated in FIG. 2, comprises a bore 132 having spaced apart operating ports formed thereon including an inlet port 134, an outlet port 136, and a tank port 138. The inlet port 134 is connected to passageway 130 and thus to the high pressure port 124. The outlet port 136 is adapted to be communicated with port 134 by means of a spool 140 which is reciprocally mounted in the bore 132. The tank port 138 communicates the bore 132 with a passageway 142. The passageway 142 is connected to a longitudinal passageway 144 which communicates with the servomechanism for the purpose of draining excess fluids away from the valves 126 and 128. The valve 128 is identical to valve 126 and its components are indicated by the same numerals followed by the letter *a*.

On the right end of each spool 140 and 140a, there is provided a pressure chamber 150 within which is mounted a spring 152, the purpose of which is to bias the spool such that the operating ports 134 and 136 are in communication; thus, high pressure fluid will flow from the pressure port 124 into the passage 130, through port 134 and out the operating port 136. The pressure chambers 150 and 150a within the valves 126 and 128 are respectively connected to the inlet port 54 and outlet port 74 by means of passageways 154 and 156. The pressure communicated to chambers 150 and 150a will assist the springs to move the spools leftwardly in establishing communication between the operating ports.

To oppose this leftward movement, each of the valves has formed within the left end of the bore 132 a pressure chamber 156 which is connected to the pressure port 136. This is accomplished by means of a restricted passageway 158 which extends (by means of axial and radial bores within the spool) from chamber 156 to the operating port 136. Thus, the valve spool 140 is urged toward its fully open position by the action of pressure fluid from the fluid opening 54 and the supplementary force exerted by the spring 152 while this force is opposed by the action of pressure from the valve outlet port 136. The two oppositely acting forces are thus brought to bear on the valve spool 140 and said spool is moved until these opposing forces are balanced. This balance of forces is effected by movement of the valve spool until the port 136 is partially opened to the port 134, thereby increasing the pressure in chamber 156 and so that the force exerted by the action of the pressure fluid in chamber 156 upon the end of the spool equals the combined forces exerted by the action of the pressure fluid from the fluid opening 54 on the opposite end of the spool and the supplementary force exerted thereon by spring 152. The spool valve 140 is thus moved to maintain the fluid in chamber 156, and, thus, the fluid through operating port 136, at a pressure exceeding the pressure existing in fluid opening 54 by an amount corresponding to the force exerted by the spring 152 at all times when fluid passes through the operating port 136. This difference in pressures is substantially a constant value, determined by the spring 152 and is maintained, irrespective of the absolute values of the pressures. For example, if a constant 100 p.s.i. differential is desired between the pressure in fluid opening 54 and the pressure operating port 136, a spring which will exert a force which is the equivalent of 100 p.s.i. is required.

Since the valve 128 is identical to the valve 126, the pressure fluid being admitted through operating port 136a will be at a constant differential value over the pressure in fluid opening 74; that value corresponding to the force exerted by the spring 152a.

The pressure being admitted from operating port 136 of the valve 126 is communicated to the diametrically opposed grooves 92 and 96 by means of an L-shaped passage 160 and the longitudinal axial bores 162 and 164, while the pressure being admitted from the operating port 136a of the valve mechanism 128 is communicated to the diametrically opposed grooves 88 and 90 by means of the L-shaped passageway 166 and the longitudinal axial bores 168 and 170. Simultaneously, the pressure from valves 126 and 128 are respectively communicated with longitudinal passageways 172 and 174, both of which are connected to shuttle valve 176 located within an enlarged bore 178. It can be readily seen that the valve which is admitting the higher pressure will communicate by means of the shuttle 176 with an axially extending bore 180. The axially extending bore 180 communicates with the annular groove 106 and thus, with the four annularly spaced apart grooves 98 through 104, and thus communicates with the pressure chambers 84 underneath the vanes as those chambers rotate through the true arc portions. A spool valve similar to valve 126 may be incorporated in bore 180 to further reduce the true arc undervane pressure to a predetermined differential.

It should be noted that although pressure from the valves 126 and 128 communicate directly with the annular spaced apart grooves located in the cover plate 18, they do not directly communicate with the circular grooves located in the body 16. However, pressure entering the undervane pressure chambers 84 from the circular grooves located in the cover plate 18 will be communicated pressure from the pressure chambers 84 to the corresponding annular grooves in the body 16. The reason for this is to provide a pressure balance on both sides of the rotor so that the rotor is centrally balanced between the cover plate 18 and the body 16. This central balancing of the rotor between the two portions 16 and 18 will prevent undue wear between the same and, thus, minimize leakage between the under-pressure chambers 84 and the outlet and inlet pressure zones herebefore mentioned.

Referring now to FIG. 6 where there is shown a diagrammatic illustration of the fluid flow path, there is illustrated a servomechanism at 182 to which is supplied a pressure from any suitable source of pressure energy such as a pump 185 by means of a conduit 184. The servomechanism is adapted to selectively direct fluid pressure to the ports 44 and 56 to obtain rotation of the servomotor in a neutral position. For example, in a 3000 p.s.i. operating system, the servomechanism directs fluid pressure at 1500 p.s.i. to each port 44 and 56, and thus into both the inlet and delivery zones with the resultant effect of no rotary motion of the rotor. If the servomechanism is actuated such as to create a different pressure between the ports 44 and 56, as for example 2000 p.s.i. at 44 and 1000 p.s.i. at port 56, the operating pressures acting on the adqacent faces of the vanes that are associated with the ports 52 and 54 will cause rotation of the rotor and shaft in a counterclockwise direction as viewed in FIG. 6, while the fluid associated with the vanes in the fluid delivery zones will be discharged through ports 74 and 76. If the servomechanism 182 is reversed, such that high pressure fluid is supplied through port 56 and via passageways 60 and 62 into the ports 74 and 76, the pressure fluid acting against the vanes will cause the rotor to rotate in a clockwise direction, while the fluid in chambers asociated with ports 54 and 52 will be exhausted therethrough into the passageways 48 and 50 and out of port 44 and into the servomechanism.

As hereinbefore mentioned, satisfactory operation of the motor requires that the radially inner ends of the vanes 86 be supplied with high pressure fluid while the radial outer ends thereof are passing through the several fluid working zones. For increased efficiency of the motor and reduced wear of the vanes and vane track and for reduction in counter torque, it is also necessary that the pressure of the fluid on the radially inner ends of the vanes 86 be slightly greater than the pressure on the radially outer ends thereof; that is, there should be a predetermined pressure differential between the inner and outer ends of the vanes throughout the entire rotary cycle of the device. It should be noted that the means by which these operating conditions are provided, and by which they are changed to correspond to a change in location of the inlet and delivery areas upon a reversal of direction of the rotation of the rotor are important features of the present invention in that this is accomplished without directly communicating fluid from the inlet and delivery ports to the undervane chambers.

Assuming now that the direction of the rotor as viewed in FIG. 6 is counterclockwise, that is, high pressure fluid is being fed from the servo valve mechanism into port 44 and to ports 52 and 54 while exhaust fluid is being exhausted through ports 74 and 76 to port 56 and back to the servo mechanism. The high pressure source which is being fed into the servo mechanism 182 from pump 185 is also being supplied simultaneously to the servomotor port 124 and by means of the passageway 130 it is directed to the inlet ports 134 and 134a of the valves 126 and 128 respectively. It should be noted that the high pressure being admitted into the servomotor through port 124 is a portion of the high pressure fluid which bypasses the servo mechanism, therefore having little effect on the output of the servo mechanism, and, thus, its control over the servomotor. By not tapping fluid from the servomotor input and exhaust to supply pressure to the undervane chambers, flow variations within the servomotor are minimized, thus, smoothest of operations is further assured.

As herebefore mentioned, pressure in the ports 52 and 54 is fed to the pressure chamber 150 of the valve 126 and acts against the spool 140 and with the supplementary force exerted by the spring 152, the spool is shifted leftwardly towards the chamber 156. The pressure which is admitted into the valve 126 through the port 134 then passes across a sealing land 139 and into the passageway 126. At the same time, this pressure fluid passes by mean of bore 158 and to the chamber 156 which will tend to shift the valve rightwardly to close off communication between ports 134 and 136. The valve will position itself in such a manner that the pressure in chamber 156 is equal to the sum of the forces exerted in chamber 150 by both the pressure therein and the spring force. The net result being that the pressure being admitted from the valve 126 will be at a value somewhat higher than the pressure entering the ports 52 and 54; that value being dependent upon the size of the spring 152. If, for example, a spring exerting a force which is equivalent to 100 p.s.i. is utilized, the pressure differential between the ports 52 and 54 and that of the pressure being admitted from the valve 126 will be 100 p.s.i. The flow or pressure fluid leaving the valve 126 will enter the passageway 160 and be directed to the undervane ports 92 and 96 formed within the cover plate 18 and at the same time will be directed to the reversing valve 176 by means of the passageway 172. The pressure in the porting chambers 92 and 96 will communicate with the undervane chambers in the rotor associated therewith as the rotor rotates within the motor. At the same time, high pressure fluid in the passageway 130 is admitted into the chamber 134a of the valve 128 and will communicate with the outlet port of valve 128 in the same manner of operation as valve 126. The pressure differential of fluid being admitted from the port 136a will be dependent upon the spring 152a. The pressure, however, will be substantially lower than that of the pressure coming from valve 126, since the pressure acting against the spool 140a is dependent upon the pressure being communicated from line 58 to the pressure chamber 150a, this being exhaust pressure, it will be substantially lower than the inlet pressure. Pressure admitted from valve 128 will enter the line 166 and be directed to the ports 88 and 90, and thus, will communicate with the undervane pressure chambers 84 associated therewith as the same rotates past ports 88 and 90. At the same time, pressure in line 166 will communicate with the reversing valve by means of passageway 174. Whichever pressure is greater in the reversing valve passages 172 and 174 will, in turn, be communicated with the passage 180 and by means thereof to the undervane ports which are located in the true arc portions; namely, ports 98 through 104, and thus, with the undervane pressure chambers in the rotor associated therewith as the rotor passes thereover.

It can thus be seen that the present valving arrangement provides a predetermined pressure differential between the undervane area and the outer vane area which varies with location and with absolute pressure. Thus, in the inlet pressure zone from A to B, the pressure acting on the outer vanes will be the inlet pressure in port 54, and the pressure under the vanes will be that same pressure plus 100 p.s.i. Thus, the pressure differential acting on the vane will tend to push the vanes out into engagement with the track with a sufficient amount of force to maintain it tracking thereagainst, but, with a minimum amount of force such that frictional losses are decreased and damage to the vane track is minimized. In the same manner, by means of the present valving system, pressure is directed to the chambers 88 and 90 in the outlet zone C–D and the pressure differential between the undervane area and the outlet ports 74 and 76 will be of a predetermined pressure differential, namely, 100 p.s.i. Again, the vanes are firmly held against the track, but at a value which is just sufficient to maintain contact without causing undue frictional losses, and vane track damage. During the true arc portion wherein the vanes generally partake of no radial movement, the pressure acting under the vanes is that pressure which is of the higher value of the two pressures being admitted from the valves 126 and 128, thus, there is assured that the pressure differential between the inner and outer surfaces will always be such that the higher pressure is acting under the vanes, thereby creating a force unbalance tending to push the vanes outward into engagement with the track.

It can thus be seen that the present invention has provided a new and improved servomotor of the sliding vane type which insures complete extension of the vanes and maintains the same engagement with the vane track without excessive force being utilized and does so throughout the entire rotary cycle of the device.

It can also be seen that the present invention provides a servomotor of the sliding vane type which is capable of smooth, low speed operation, with a minimal amount of internal friction; thus, with a minimum amount of torque pulsation and with a minimum of counter torque.

Devices embodying the present invention operate at much lower speeds and higher pressures than conventional devices of the type hereinbefore used; and yet, with a minimal amount of torque pulsation.

While the form of embodiment of the invention as herein disclosed constitutes a preferred form, it is to be understood that other forms might be adopted, all coming within the scope of the claims which follow.

What we claim as new and desire to secure by Letters Patent of the United States is:

1. A servo-operated rotary fluid pressure energy translating device of the type having low and high pressure operating passages in which said servo is adapted to selectively connect said operating passages to a source of high pressure energy to drive said device wherein said pressure energy translating device comprises: a cam track having low and high pressure ramps, one of which is in fluid communication with said low pressure operating passages; a rotor having a plurality of radial slots formed therein and rotatably mounted within said cam track; a plurality of driving elements slidably mounted within said slots wherein an outer end of each element is adapted to abut the track and the fluid in the inter element spaces subjects the outer ends of said elements to the pressure of the fluid in said spaces as the elements traverse the cam track pressure ramps, said driving elements moving radially inwardly and outwardly in response to the contour of said cam track; means forming a pressure chamber within each slot, the pressure in each chamber being effective to urge the outer end of the driving element associated with each slot into engagement with the track; pressure reducing means connected to said source of high pressure energy, said means reducing said high pressure energy to a value which exceeds the value of the pressure of the fluid in said inter element spaces associated with the high pressure ramps by a predetermined value; and, porting means for communicating said reduced high pressure to the pressure chambers associated with those driving elements traversing the high pressure ramps whereby the pressure in said associated pressure chambers exceeds the pressure acting on the outer ends of their associated driving elements by a predetermined amount when said associated elements traverse the high pressure ramps.

2. A combination as in claim 1 including a second pressure reducing means connected to said source of high pressure energy, said second means reducing said high pressure energy to a value which exceeds the value of the pressure of the fluid in said inter element spaces associated with the low pressure ramps by a predetermined value; and, second porting means for communicating said second reduced high pressure to the pressure chambers associated with those driving elements traversing the low pressure ramps whereby the pressure in said associated pressure chambers exceeds the pressure acting on the outer ends of their associated driving elements by a predetermined amount when said associated elements traverse the low pressure ramps.

3. A combination as in claim 2 including arc portions of said cam track wherein said driving elements generally partake of no radial movement, said arc portions being located between the high and low pressure ramps; and means connecting said first mentioned reduced high pressure to those pressure chambers associated with the driving elements traversing the arc portion of said cam track.

4. A combination as in claim 2 wherein said driving elements comprise vanes slidably mounted within said slots.

5. A combination as in claim 1 wherein said pressure reducing means comprises: a housing having a bore with spaced apart ports formed therein, one of said ports being an inlet port connected to said source of high pressure energy, the other of said ports being an outlet port connected to said porting means; a spool reciprocally mounted in said bore for opening and closing communication between said spaced apart ports; means forming first and second pressure chambers at opposite ends of said bore, said pressure chambers exerting a force on said spool in opposed relationship respectively urging said spool to close and open communication between said spaced apart ports, said first chamber being connected to said outlet port, said second chamber being connected to the inter element spaces associated with the high pressure ramps; and, resilient means exerting a force on said spool opposing the force exerted by said first chamber, whereby the pressure being admitted from said outlet port exceeds the pressure in the second chamber and thus, the pressure in the inter element spaces associated with the high pressure ramps by the value of the force exerted by said resilient means.

6. A combination as in claim 5 wherein said resilient means comprises a mechanical spring disposed in said second pressure chambers.

7. A combination as in claim 6 wherein said driving elements comprise vanes slidably mounted within said slots.

8. A combination as in claim 2 wherein said first mentioned pressure reducing means comprises: a first housing means having a bore with spaced apart ports formed therein, one of said ports being an inlet port connected to said source of high pressure energy, the other of said ports being an outlet port connected to said first mentioned porting means; a spool reciprocally mounted in said bore for opening and closing communication between said spaced apart ports, means forming first and second pressure chambers at opposite ends of said bore, said pressure chambers exerting a force in said spool in opposed relationship respectively urging said spool to close and open communication between said spaced apart ports, said first chambers being connected to said outlet port, said second chambers being connected to the inter element spaces associated with the high pressure ramps; and resilient means exerting a force on said spool opposing the force exerted by said first chamber, whereby the pressure admitted from said outlet port exceeds the pressure in the second chamber and thus the pressure in the inter element spaces associated with the high pressure ramps by the value of the force exerted by said resilient means; and wherein said second mentioned pressure reducing means comprises: a second housing having means having a second bore with spaced apart ports formed therein, one of said ports being a second inlet port connected to said source of high pressure energy, the other of said ports being a second outlet port connected to said second mentioned porting means; a second spool reciprocally mounted in said second bore for opening and closing communication between said second spaced apart ports; means forming third and fourth pressure chambers at opposite ends of said second bore, said third and fourth pressure chambers exerting a force on said spool in opposed relationship respectively urging said second spool to close and open communication between said second spaced apart ports, said third chamber being connected to said second outlet port, said fourth chamber being connected to the inter element spaces associated with the low pressure ramps; and second resilient means exerting a force on said second spool opposing the force exerted by said third chamber, whereby the pressure admitted from said second outlet port exceeds the pressure in said fourth chamber and thus, the pressure in the inter element spaces associated with the low pressure ramps by the value of the force exerted by said second resilient means.

9. A combination as in claim 8 wherein said first and second resilient means comprise mechanical springs respectively disposed in said second and fourth pressure chambers.

10. A combination as in claim 8 including arc portions of said cam track wherein said driving elements generally partake of no radial movement, said arc portions being located between the high and low pressure ramps; means for sensing which ever pressure being admitted from said first and second outlet ports is the higher pressure and, means for connecting said sensed higher pressure to their pressure chambers associated with the driving elements traversing the arc portions of said cam track.

11. A combination as in claim 10 wherein said driving elements comprise vanes slidably mounted within said slots.

References Cited

UNITED STATES PATENTS

| | | | |
|---|---|---|---|
| 2,967,488 | 1/1961 | Gardiner | 103—136 |
| 3,329,067 | 7/1967 | Rosaen | 91—138 |
| 3,421,413 | 1/1969 | Adams et al. | 91—135 |
| 3,447,477 | 6/1969 | Pettibone | 103—136 |
| 3,455,245 | 7/1969 | Reichling | 103—136 X |

DONLEY J. STOCKING, Primary Examiner

W. J. KRAUSS, Assistant Examiner

U.S. Cl. X.R.

60—53; 418—80